(12) United States Patent
Wiedmann et al.

(10) Patent No.: US 8,310,955 B1
(45) Date of Patent: *Nov. 13, 2012

(54) AUTOMATED DISCOVERY OF ACCESS POINTS IN WIRELESS COMPUTER NETWORKS

(75) Inventors: Ulrich Wiedmann, Redwood City, CA (US); Terrance L. Lillie, Redwood City, CA (US); Richard P. Sneiderman, Sunnyvale, CA (US); Christian Wiedmann, Redwood City, CA (US); Robert Zeljko, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/070,128

(22) Filed: Mar. 23, 2011

Related U.S. Application Data

(63) Continuation of application No. 10/861,609, filed on Jun. 4, 2004, now Pat. No. 8,068,441.

(60) Provisional application No. 60/476,779, filed on Jun. 5, 2003.

(51) Int. Cl.
*H04L 12/28* (2006.01)

(52) U.S. Cl. .................. 370/254; 370/395.5; 370/220; 455/418

(58) Field of Classification Search .................. 370/254, 370/395.5; 709/220; 455/418
See application file for complete search history.

(56) References Cited

U.S. PATENT DOCUMENTS

| | | | |
|---|---|---|---|
| 6,011,975 A | 1/2000 | Emery et al. | |
| 6,026,304 A | 2/2000 | Hilsenrath et al. | |
| 6,145,001 A | 11/2000 | Scholl et al. | |
| 6,195,705 B1 | 2/2001 | Leung | |
| 6,292,838 B1 | 9/2001 | Nelson | |
| 6,600,734 B1 | 7/2003 | Gernert et al. | |
| 7,016,949 B1 | 3/2006 | Tagawa | |
| 7,272,635 B1 | 9/2007 | Longtin et al. | |
| 7,370,087 B1 | 5/2008 | O'Toole, Jr. | |
| 7,512,081 B2 | 3/2009 | Ayyagari et al. | |
| 2001/0021170 A1 | 9/2001 | Hansson et al. | |
| 2003/0003912 A1 | 1/2003 | Melpignano et al. | |
| 2003/0041125 A1 | 2/2003 | Salomon | |
| 2003/0134596 A1 | 7/2003 | Zhu | |
| 2003/0179734 A1 | 9/2003 | Tsutsumi et al. | |

(Continued)

FOREIGN PATENT DOCUMENTS

WO          0114988 A1    3/2001

(Continued)

OTHER PUBLICATIONS

Motegi Shinji et al., "Proposal of Service Discovery for Wireless AD Hoc Networks" http://sciencelinks.jp/j-east/article/200302/000020030203A0026687.php.

(Continued)

*Primary Examiner* — Ayaz Sheikh
*Assistant Examiner* — Mounir Moutaouakil
(74) *Attorney, Agent, or Firm* — Wong, Cabello, Lutsch, Rutherford & Brucculeri, L.L.P.

(57) ABSTRACT

As part of a wireless access point configuration process, a computer network is probed and each previously unprogrammed wireless access point on the network is programmed by transmitting wireless network configuration parameters thereto using a software agent residing on a node of the computer network.

21 Claims, 3 Drawing Sheets

U.S. PATENT DOCUMENTS

| | | |
|---|---|---|
| 2003/0193946 A1 | 10/2003 | Gernert et al. |
| 2003/0217289 A1 | 11/2003 | Ammon et al. |
| 2004/0068653 A1 | 4/2004 | Facenda |
| 2004/0076138 A1 | 4/2004 | Serceki et al. |
| 2004/0098506 A1 | 5/2004 | Jean |
| 2004/0121648 A1 | 6/2004 | Voros |
| 2004/0198220 A1 | 10/2004 | Whelan et al. |
| 2004/0246922 A1 | 12/2004 | Ruan et al. |
| 2005/0034029 A1 | 2/2005 | Ramberg et al. |
| 2005/0089052 A1 | 4/2005 | Chen et al. |
| 2006/0133332 A1* | 6/2006 | Achanta ............ 370/338 |
| 2007/0115962 A1* | 5/2007 | Mammoliti et al. ...... 370/389 |
| 2007/0299944 A1 | 12/2007 | Bodin et al. |
| 2009/0070478 A1 | 3/2009 | Herman et al. |
| 2009/0183086 A1 | 7/2009 | Solyanik et al. |
| 2010/0023763 A1 | 1/2010 | Chandranmenon et al. |

FOREIGN PATENT DOCUMENTS

| | | |
|---|---|---|
| WO | 0130003 A1 | 4/2001 |
| WO | 02089411 A2 | 11/2002 |
| WO | 02103988 A1 | 12/2002 |
| WO | 03093951 A2 | 11/2003 |
| WO | 03101023 A2 | 12/2003 |
| WO | 2004013986 A1 | 2/2004 |
| WO | 2004034214 A2 | 4/2004 |

OTHER PUBLICATIONS

A.O. Mahajan et al., "A Comparison of channel scanning schemes for distributed network formation and reconfiguration" Wireless ENtwors 4 (1998) 341-351.

Nitin H. Vaidya, "Weak Duplicate Address Detection in Mobile Ad Hoc Networks".

Motegi, S. et al., "Service Discovery for Wireless Ad Hoc Networks" Wireless Personal Multimedia Communications, 2002, The 5th International Symposium, Oct. 27-30, 2002.

Office Action mailed Jul. 16, 2008 for corresponding U.S. Appl. No. 10/861,609.

Final Office Action mailed Jan. 9, 2009 for corresponding U.S. Appl. No. 10/861,609.

Office Action mailed Oct. 2, 2009 for corresponding U.S. Appl. No. 10/861,609.

Office Action mailed Mar. 2, 2010 for corresponding U.S. Appl. No. 10/861,609.

Office Action mailed Jun. 16, 2010 for corresponding U.S. Appl. No. 10/861,609.

* cited by examiner

AUTOMATED DISCOVERY OF ACCESS POINTS IN WIRELESS COMPUTER NETWORKS

CROSS REFERENCE TO RELATED APPLICATIONS

This application is a continuation application of U.S. patent application Ser. No. 10/861,609, filed on Jun. 4, 2004, entitled "Automated Discovery of Access in Wireless Computer Networks", which claims the benefit of U.S. Provisional Application 60/476,779, filed on Jun. 5, 2003, entitled "Automated Discovery of Access in Wireless Computer Networks", which are hereby incorporated by reference and to which priority is claimed.

FIELD OF THE INVENTION

The present invention relates to schemes for probing a computer network to discover attached access points to be configured as part of a wireless LAN.

BACKGROUND

Wireless local area networks (WLANs), such as those based on the IEEE 802.11a, 802.11b and 802.11g standards, are becoming ubiquitous in business, government and small office/home office (SOHO) settings because of the freedom afforded by and the decreasing costs of the underlying technology.

Before discussing the 802.1x access point configuration in detail, it is helpful to review some basics of WLANs in general. Unlike their wired LAN counterparts, WLANs provide for communication among network elements through wireless transmissions (e.g., radio transmissions), as opposed to wired, physical connections. Unfortunately, implementing an 802.1x solution for a WLAN is not an easy tack. For example, the required network infrastructure is complex (potentially involving multiple authentication servers for use in cases of equipment failures) and expensive.

Installing an AP to create a new WLAN or even within an existing WLAN can be a time consuming process, especially for an unsophisticated user. Usually, the user must step through several screens of a graphical user interface in order to set various security and/or authentication parameters. Consequently, deployment of 802.1x compliant WLANs has not yet become widespread at an enterprise level and is virtually nonexistent at a SOHO level.

SUMMARY OF THE INVENTION

Methods and apparatus for the automated discovery of access points in wireless computer networks are described. In one embodiment, as part of a wireless access point configuration process, a computer network is probed and each previously unprogrammed wireless access point on the network is programmed by transmitting wireless network configuration parameters thereto using a software agent residing on a node of the computer network. In one particular embodiment the software agent periodically probes the network for new access points by sending messages to known communication ports of the new access points. Upon discovery, each new access point provides the software agent with an associated configuration interface, through which the new access point can be programmed using the configuration parameters. The network parameters may include some or all of static WEP keys, SSIDs, fallback keys, and MAC address filter lists.

BRIEF DESCRIPTION OF THE DRAWINGS

A better understanding of the present invention can be obtained from the following detailed description in conjunction with the following drawings, in which.

DETAILED DESCRIPTION

Described herein are methods and apparatus for probing a computer network to discover attached access points to be configured as part of a wireless LAN.

In the following discussion, much of the information is described in terms of processes and procedures to be implemented by one or more computer systems executing appropriate algorithms which are embodiments for the present invention. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the actions and processes of a computer system or similar electronic computing device, that manipulates and transforms data represented as physical (electronic) quantities within the computer system's registers and memories into other data similarly represented as physical quantities within the computer system's memories or registers or other such information storage, transmission or display devices. Moreover, as used herein, the term table can refer to any data structure.

Figure 1:
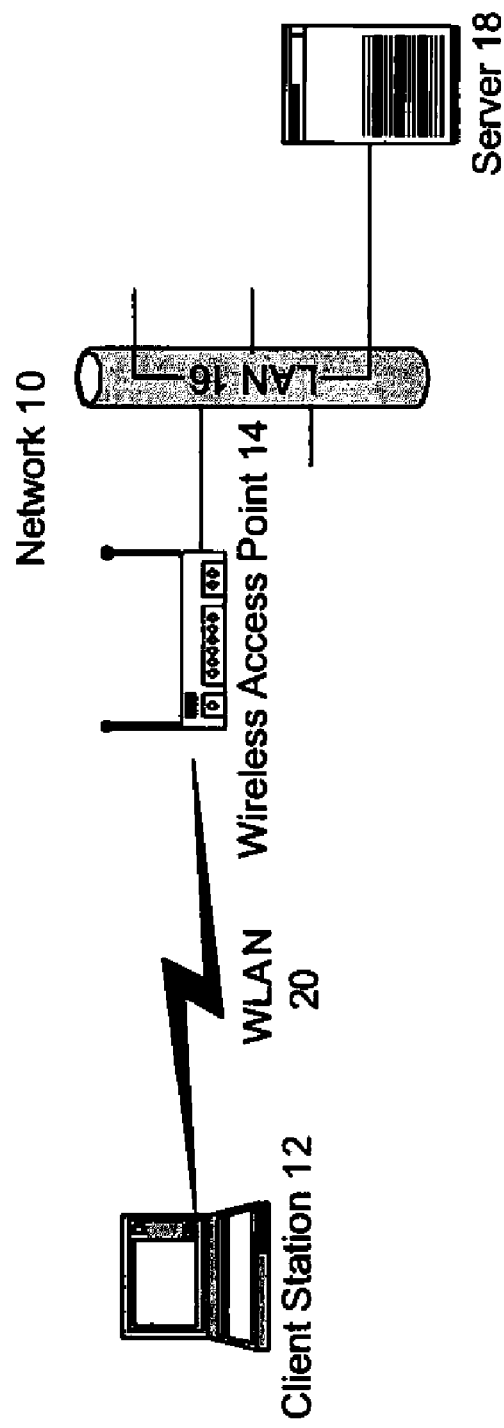
FIG. 1 illustrates an exemplary network including a WLAN according to one embodiment of the present invention.

FIG. 1 illustrates an exemplary network 10 including a WLAN, according to one embodiment of the present invention. In 802.11-based WLANs, clients or "stations" 12 (i.e., computers with wireless networks interface cards (NICs)) interact with other network devices (printers, file servers, other clients, etc.) through access points (APs) 14, which act as bridges between the wired network 16 and wireless network 20. In some cases, wireless clients 12 may communicate directly with one another, without the use of APs.

Figure 2:
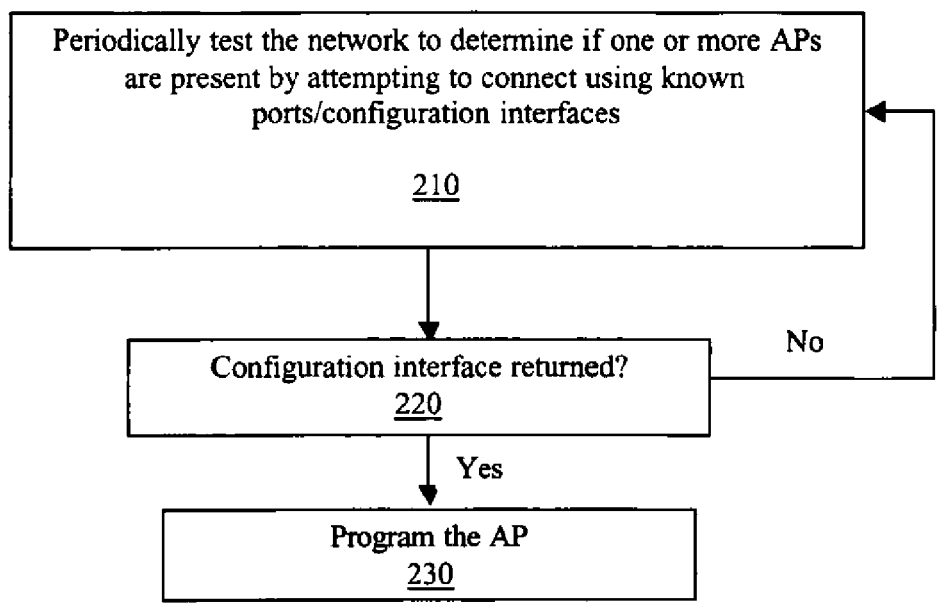
FIG. 2 illustrates and automated access point discovery process, according to one embodiment of the present invention.

FIG. 2 illustrates an automated access point discovery process 200, according to one embodiment of the present invention. To alleviate the burden of network configuration with an access point 14 in a wireless computer network 20, the present invention provides for automated discovery and set up of an AP 14. This is especially useful where a user wishes to add a new AP 14 to an existing network 10, but may even be used where no WLAN 20 has been installed or a new WLAN 20 is being set up in a network that has existing WLANs 20. Such automated discovery involves the use of a software agent installed on an existing client 12 or server 18 of a LAN 16 and which periodically tests the network 16 to determine if one or more APs 14 are present. (block 210) Such probing may be done by having the agent attempt to connect to the APs 14 using known HTTP, SNMP and/or Telnet ports (e.g., published by the AP's manufacturer) and seeing if any response is provided. FIG. 2 shows one example of such a procedure.

More specifically, existing AP vendors construct their equipment so as to provide configuration interfaces for the APs. Such interfaces are generally accessed through an HTML page at a specified IP address. Provided such IP address has not been altered by the user (in which case the new IP address would need to be provided to the software agent), the agent can periodically test the known IP addresses of different types of APs 14 to see whether or not a configuration interface is returned. (block 220) Alternatively, or in addition, one could simply test all local IP addresses, and use the response retuned to identify what kind of AP 14 is involved. In such cases it would not matter whether or not a user had altered the AP's IP address so long as the AP 14 is accessible on the local network 16.

If a configuration interface is so returned by an AP 14, the agent can proceed to program the AP 14 with various parameters, such as static WEP keys, SSIDs, fallback keys, MAC address filer lists, fine grained access control parameters, and so on. (block 230) This automated configuration may be performed in response to a user authorization or simply may be done without any user activity whatsoever. The agent essentially acts a source of information for the AP's 14 existing user interface in much the same way as human users are required to do for conventional WLAN installations. By removing the need for human intervention, however, the present invention simplifies and speeds up the AP installation process.

Figure 3:
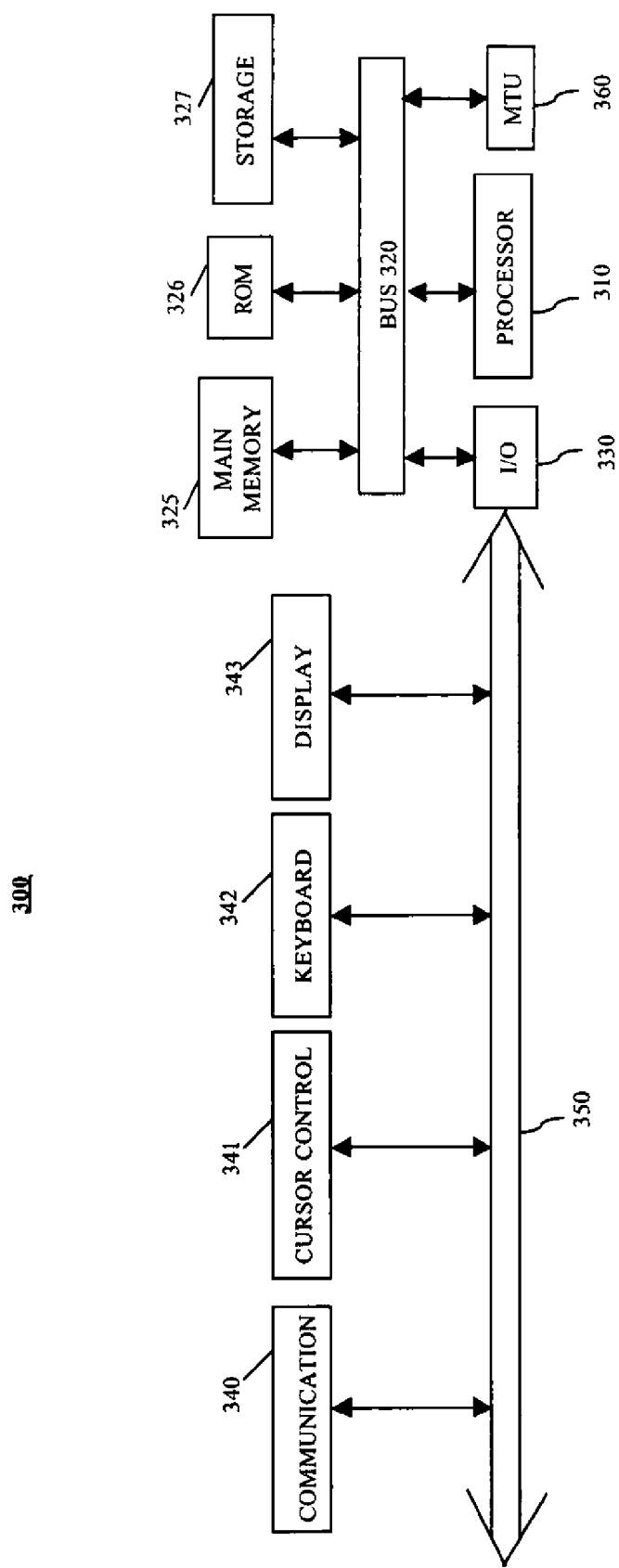
FIG. 3 illustrates an exemplary computer architecture, according to one embodiment of the present invention.

Having briefly described an exemplary network architecture 10 which employs various elements of the present invention, a computer system 300 representing exemplary clients 12, access points 14, and/or servers (e.g., servers 18), in which elements of the present invention may be implemented will now be described with reference to FIG. 3.

One embodiment of computer system 300 comprises a system bus 320 for communicating information, and a processor 310 coupled to bus 320 for processing information. Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 may also include a read only memory (ROM) and/or other static storage device 326 coupled to bus 320 for storing static information and instructions used by processor 310.

A data storage device 327 such as a magnetic disk or optical disc and its corresponding drive may also be coupled to computer system 300 for storing information and instructions. Computer system 300 can also be coupled to a second I/O bus 350 via an I/O interface 330. Multiple I/O devices may be coupled to I/O bus 350, including a display device 343, an input device (e.g., an alphanumeric input device 342 and/or a cursor control device 341). For example, Internet information may be presented to the user on the display device 343.

The communication device 340 is for accessing other computers (servers or clients) via a network 10, 16, 20. The communication device 340 may comprise a modem, a network interface card, a BlueTooth transceiver, an 802.1x transceiver, or other well-known interface device, such as those used for coupling to Ethernet, token ring, wireless or other types of networks.

Thus, methods and apparatus for the automated discovery of access points in wireless computer networks have been described. It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the forgoing description and which are not disclosed in the prior art.

The invention claimed is:

1. A method comprising:
   probing a computer network to discover one or more wireless access points by sending messages to known communication ports of the wireless access points, wherein the probing includes periodically testing the computer network by the software agent to determine if the one or more wireless access points are present;
   receiving, in response to the messages, access to configuration interfaces of the wireless access points through which the wireless access points can be programmed; and
   automatically, without user activity, programming each unprogrammed wireless access point by transmitting wireless network configuration parameters to the unprogrammed wireless access point using a software agent residing on a node of the computer network.

2. The method of claim 1, wherein the probing comprises transmitting additional messages to all local network IP addresses and a returned response is used to identify a kind of each wireless access point involved within the computer network.

3. The method of claim 1, wherein the software agent automatically programs each unprogrammed wireless access point with the wireless network configuration parameters upon detection of the unprogrammed wireless access point on the computer network.

4. A method comprising:
   probing a computer network to discover one or more wireless access points by sending messages to known communication ports of the wireless access points;
   receiving, in response to the messages, access to configuration interfaces of the wireless access points through which the wireless access points can be programmed; and
   automatically programming each unprogrammed wireless access point by transmitting wireless network configuration parameters to the unprogrammed wireless access point using a software agent residing on a node of the computer network, wherein the software agent automatically programs each unprogrammed wireless access point with the wireless network configuration parameters in response to a user authorization but without further user activity.

5. The method of claim 4, wherein the probing comprises transmitting additional messages to all local network IP addresses and a returned response is used to identify a kind of each wireless access point involved within the computer network.

6. The method of claim 4, wherein the software agent automatically programs each unprogrammed wireless access point with the wireless network configuration parameters upon detection of the unprogrammed wireless access point on the computer network.

7. The method of claim 4, wherein the probing includes periodically testing the computer network by the software agent to determine if the one or more wireless access points are present.

8. A computer system comprising:
a processor,
a communication device operatively coupled to the processor and configurable to access other computers via a network; and
a memory operatively coupled to the processor, the memory having stored therein instructions executable by the processor to cause the computer system to:
probe the network to discover one or more wireless access points by sending messages to known communication ports of the wireless access points;
receive, in response to the messages, access to configuration interfaces of the wireless access points through which the wireless access points can be programmed; and
automatically, without user activity, program each unprogrammed wireless access point by transmitting wireless network configuration parameters to the unprogrammed wireless access point using a software agent residing on a node of the computer network; and
periodically test the network to determine if the one or more wireless access points are present.

9. The computer system of claim 8, wherein the memory stores further instructions executable by the processor to cause the computer system to:
transmit additional messages to all local network IP addresses; and
identify, from a response to one or more of the additional messages, a kind of each wireless access point involved within the computer network.

10. The computer system of claim 8, wherein the memory stores further instructions executable by the processor to automatically program each unprogrammed wireless access point with the wireless network configuration parameters upon detection of an unprogrammed wireless access point on the computer network.

11. A computer system comprising:
a processor,
a communication device operatively coupled to the processor and configurable to access other computers via a network; and
a memory operatively coupled to the processor, the memory having stored therein instructions executable by the processor to cause the computer system to:
probe the network to discover one or more wireless access points by sending messages to known communication ports of the wireless access points;
receive, in response to the messages, access to configuration interfaces of the wireless access points through which the wireless access points can be programmed; and
automatically program each unprogrammed wireless access point by transmitting wireless network configuration parameters to the unprogrammed wireless access point using a software agent residing on a node of the computer network in response to a user authorization but without further user activity.

12. The computer system of claim 11, wherein the memory stores further instructions executable by the processor to cause the computer system to:
transmit additional messages to all local network IP addresses; and
identify, from a response to one or more of the additional messages, a kind of each wireless access point involved within the computer network.

13. The computer system of claim 11, wherein the memory stores further instructions executable by the processor to automatically program each unprogrammed wireless access point with the wireless network configuration parameters upon detection of an unprogrammed wireless access point on the computer network.

14. The computer system of claim 11, wherein the memory stores further instructions executable by the processor to periodically test the network to determine if the one or more wireless access points are present.

15. A computer program product embodied on a non-transitory computer readable medium, comprising computer code executable by a computer system to:
probe a network to discover one or more wireless access points by sending messages to known communication ports of the wireless access points;
receive, in response to the messages, access to configuration interfaces of the wireless access points through which the wireless access points can be programmed;
automatically, without user activity, program each unprogrammed wireless access point by transmitting wireless network configuration parameters to the unprogrammed wireless access point using a software agent residing on a node of the computer network; and
cause the computer system to periodically test the network to determine if the one or more wireless access points are present.

16. The computer program product of claim 15 further comprising computer code executable by the computer system to cause the computer system to:
transmit additional messages to all local network IP addresses; and
identify, from a response to one or more of the additional messages, a kind of each wireless access point involved within the computer network.

17. The computer program product of claim 15 further comprising computer code executable by the computer system to cause the computer system to automatically program each unprogrammed wireless access point with the wireless network configuration parameters upon detection of an unprogrammed wireless access point on the computer network.

18. A computer program product embodied on a non-transitory computer readable medium, comprising computer code executable by a computer system to cause the computer system to:
probe a network to discover one or more wireless access points by sending messages to known communication ports of the wireless access points;
receive, in response to the messages, access to configuration interfaces of the wireless access points through which the wireless access points can be programmed; and
automatically program each unprogrammed wireless access point by transmitting wireless network configuration parameters to the unprogrammed wireless access point using a software agent residing on a node of the computer network in response to a user authorization but without further user activity.

19. The computer program product of claim 18 further comprising computer code executable by the computer system to cause the computer system to:
- transmit additional messages to all local network IP addresses; and
- identify, from a response to one or more of the additional messages, a kind of each wireless access point involved within the computer network.

20. The computer program product of claim 18 further comprising computer code executable by the computer system to cause the computer system to automatically program each unprogrammed wireless access point with the wireless network configuration parameters upon detection of an unprogrammed wireless access point on the computer network.

21. The computer program product of claim 18 further comprising computer code executable by the computer system to cause the computer system to periodically test the network to determine if the one or more wireless access points are present.

\* \* \* \* \*

UNITED STATES PATENT AND TRADEMARK OFFICE
CERTIFICATE OF CORRECTION

PATENT NO. : 8,310,955 B1
APPLICATION NO. : 13/070128
DATED : November 13, 2012
INVENTOR(S) : Ulrich Wiedmann et al.

It is certified that error appears in the above-identified patent and that said Letters Patent is hereby corrected as shown below:

Column 4, line 25, in Claim 1, after "by" delete "the" and insert --a--, therefor.

Column 4, line 34, in Claim 1, after "using" delete "a" and insert --the--, therefor.

Signed and Sealed this
Twelfth Day of February, 2013

Teresa Stanek Rea
*Acting Director of the United States Patent and Trademark Office*